US012163373B2

(12) United States Patent
Meizinger

(10) Patent No.: US 12,163,373 B2
(45) Date of Patent: Dec. 10, 2024

(54) ACCESS DOOR ASSEMBLY AND RELATED METHODS

(71) Applicant: Gregory R. Meizinger, Philadelphia, PA (US)

(72) Inventor: Gregory R. Meizinger, Philadelphia, PA (US)

( * ) Notice: Subject to any disclaimer, the term of this patent is extended or adjusted under 35 U.S.C. 154(b) by 0 days.

(21) Appl. No.: 17/663,681

(22) Filed: May 17, 2022

(65) Prior Publication Data

US 2022/0372815 A1 Nov. 24, 2022

Related U.S. Application Data

(60) Provisional application No. 63/190,286, filed on May 19, 2021.

(51) Int. Cl.

*E06B 5/01* (2006.01)
*E05F 3/02* (2006.01)
*E06B 1/52* (2006.01)
*E06B 5/10* (2006.01)
*E06B 5/02* (2006.01)
*E06B 5/04* (2006.01)

(52) U.S. Cl.

CPC .................. *E06B 5/01* (2013.01); *E05F 3/02* (2013.01); *E06B 1/52* (2013.01); *E06B 5/02* (2013.01); *E06B 5/04* (2013.01); *E06B 5/10* (2013.01)

(58) Field of Classification Search

CPC ...... E06B 5/01; E06B 1/52; E05F 3/02; E05F 15/63; E05Y 2900/132
See application file for complete search history.

(56) References Cited

U.S. PATENT DOCUMENTS 2,840,289 A * 6/1958 Murray ..................... E06C 1/56 182/77
2,917,017 A * 12/1959 Stransky ................. B63B 19/26 114/202
2,946,304 A * 7/1960 Greer .................... B63B 19/203 160/206

(Continued)

FOREIGN PATENT DOCUMENTS

CA 2733838 A1 * 9/2011 ............. E02D 29/14
FR 2616477 A1 * 10/2006
JP H07102759 A 4/1995

OTHER PUBLICATIONS

Mike Coombes "Recessed door final test—remote control" Jul. 3, 2013 https://youtu.be/2rmttt247ok.

*Primary Examiner* — Phi D A
(74) *Attorney, Agent, or Firm* — Allen, Dyer, Doppelt + Gilchrist, PA

(57) ABSTRACT

An access door assembly is for a floor structure. The access door assembly includes a door frame coupled to the floor structure and defining an opening aligned with a staircase, and an access door within the opening and having first and second longitudinal sides. The first longitudinal side defines a first opposing bevelled surface, and the floor structure adjacent the opening defines a second opposing bevelled surface. The access door assembly also includes an arm coupled to the access door and configured to pivot the access door between an open state and a closed state. The first and second opposing bevelled surfaces are aligned and abutting in the closed state, and are in spaced apart relation in the open state.

20 Claims, 10 Drawing Sheets

(56) References Cited

U.S. PATENT DOCUMENTS 3,067,453 A * 12/1962 Lyons .................... E05F 1/123
49/386
3,183,873 A * 5/1965 Hamilton ............. B63B 19/197
49/249
3,565,212 A * 2/1971 Johnson .................. E04G 1/154
182/180.1
4,133,074 A * 1/1979 Schack ................... E05F 1/123
4,873,791 A * 10/1989 Lyons, Sr. ............... E05F 1/123
49/386
5,103,934 A * 4/1992 Brooks ................. E04F 11/068
182/86
5,205,073 A * 4/1993 Lyons, Sr. ............ E05F 1/1058
52/72
5,373,665 A * 12/1994 Lyons, Sr. .......... E04D 13/0354
49/386
5,475,955 A * 12/1995 Dickinson ............ E04F 11/064
52/186
5,600,921 A * 2/1997 Vardaro .................. E05C 9/047
49/386
5,746,289 A * 5/1998 Williams .................. E04G 1/15
182/129
6,328,129 B1 * 12/2001 Ferguson ................. A62B 1/06
182/76
6,886,661 B1 * 5/2005 Battenberg ................ E06C 9/08
182/78
8,166,706 B2 * 5/2012 Slimak .................. E05B 65/006
16/361
9,409,755 B2 * 8/2016 Melton ................... B66F 11/04
10,309,076 B2 * 6/2019 Veter ..................... E02D 29/122
10,995,591 B2 * 5/2021 Horgen ...................... E05D 1/02
2010/0032240 A1 2/2010 Rodriguez Fernandez
2010/0307060 A1 * 12/2010 Slimak .................. E05B 65/006
49/70
2011/0222964 A1 * 9/2011 Lacroix ............... E02D 29/1454
404/26
2015/0184401 A1 7/2015 Steck et al.
2019/0352921 A1 11/2019 Takemoto

* cited by examiner

ACCESS DOOR ASSEMBLY AND RELATED METHODS

RELATED APPLICATION

This application is based upon prior filed copending Application No. 63/190,286 filed May 19, 2021, the entire subject matter of which is incorporated herein by reference in its entirety.

TECHNICAL FIELD

The present disclosure relates to the field of construction, and, more particularly, to an access door assembly and related methods.

BACKGROUND

The construction industry is a robust and growing business in the United States. Indeed, with the COVID-19 pandemic causing substantial migration within the population and the shortage of affordable housing in major urban areas, the construction industry has continued to grow. In addition to new construction, the existing construction (i.e. renovation) part of the business has experienced similar growth. With the pandemic changing established work patterns of behavior (e.g. work from home becoming popular), this has inspired many home owners to reevaluate the functionality of their own home.

In many urban multistory homes, the lowermost level (e.g. basement or cellar) sometimes remains underutilized due to poor access. In most cases, the floorplan of the upper floor does not permit enough room for construction of a standard staircase. In most applications, the home owner may have a trap door (i.e. a door within the floor) with a ladder or shortened staircase, or must access the lower floor from outside the home. Existing trap doors may be difficult to use, and also present an eyesore to most home owners. Because of that, many home owners cover their trap doors with furniture or rugs, further reducing the use of the lower level.

SUMMARY

Generally, an access door assembly is for a floor structure. The access door assembly includes a door frame coupled to the floor structure and defining an opening aligned with a staircase, and an access door within the opening and comprising first and second longitudinal sides. The first longitudinal side defines a first opposing bevelled surface, and the floor structure adjacent the opening defines a second opposing bevelled surface. The access door assembly also includes at least one arm coupled to the access door and configured to pivot the access door between an open state and a closed state. The first and second opposing bevelled surfaces are aligned and abutting in the closed state, and are in spaced apart relation in the open state.

In particular, the door frame may comprise first and second longitudinal supports, and the access door may pivot on the first longitudinal support. The access door assembly may also include a vertical column extending upward from a lower level and supporting the second longitudinal support. Each of the first and second longitudinal supports may comprise a plurality of structural members coupled together. The first longitudinal support may comprise a longitudinal protrusion extending upward from the plurality of structural members and defining a pivot point.

The at least one arm may be coupled between the access door and a building wall extending from a lower level. The access door may comprise an upper layer, and a support frame coupled to the upper layer. The support frame may comprise first and second frame sides, first and second frame ends extending between the first and second frame sides, first and second cross members extending between the first and second frame sides, and a railing for the staircase extending diagonally across at least one of the first and second cross members. When the access door is in the closed state, an entirety of the door frame may be below the floor structure. Each of the first and second opposing bevelled surfaces may comprise a surface canted within an angular range of 30-60 degrees, for example.

Another aspect is directed to a method for making an access door assembly for a floor structure. The method comprises coupling a door frame to the floor structure and defining an opening aligned with a staircase, and positioning an access door within the opening and comprising first and second longitudinal sides. The first longitudinal side defines a first opposing bevelled surface, and the floor structure adjacent the opening defines a second opposing bevelled surface. The method further includes coupling at least one arm to the access door and configured to pivot the access door between an open state and a closed state. The first and second opposing bevelled surfaces are aligned and abutting in the closed state, and are in spaced apart relation in the open state.

DETAILED DESCRIPTION

Figure 1:
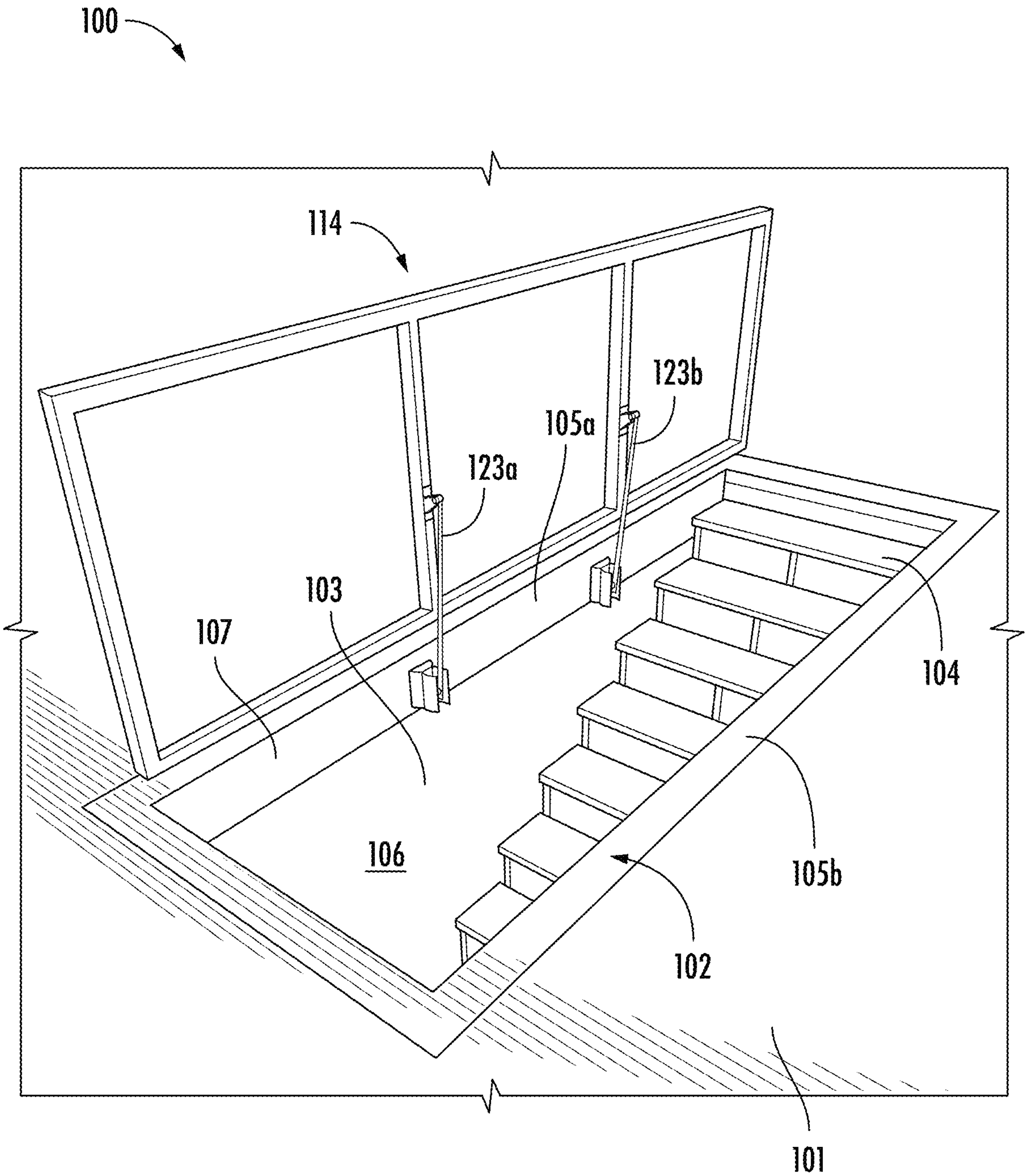
FIG. 1 is an image of a first example embodiment of an access door assembly, according to the present disclosure.
Figure 2:
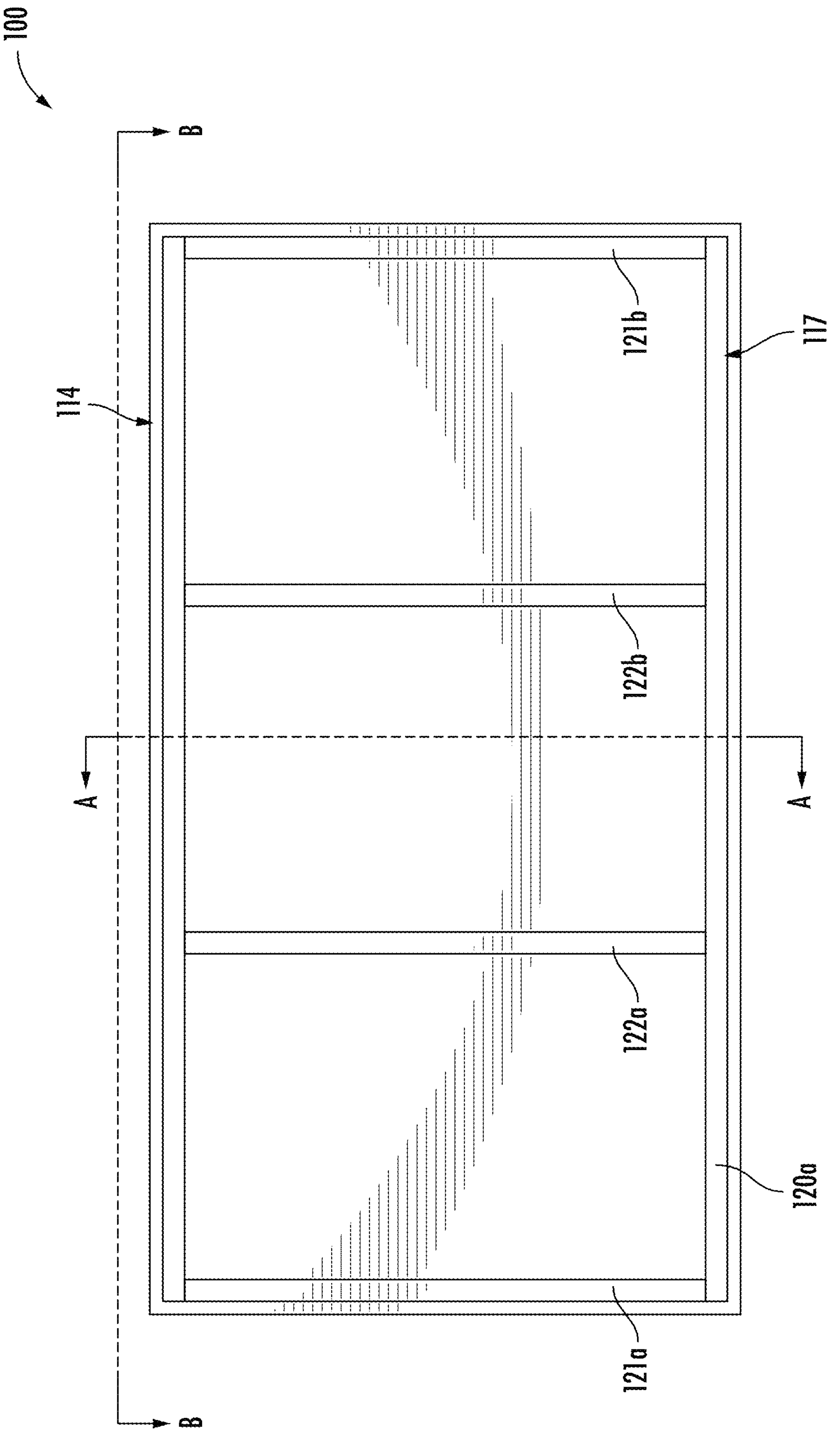
FIG. 2 is a schematic bottom plan view of the access door assembly of FIG. 1.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Generally, an access door assembly is for a floor structure. The access door assembly may include a door frame coupled to the floor structure and defining an opening aligned with a staircase, an access door within the opening, a hinge coupled between the door frame and the access door and pivoting the access door between an open state and a closed state, and at least one arm coupled between the door frame and the access door and configured to switch the access door between the open state and the closed state.

Another aspect is directed to a method for making an access door assembly for a floor structure. The method may comprise coupling a door frame to the floor structure and defining an opening aligned with a staircase, and positioning an access door within the opening. The method may also include coupling a hinge between the door frame and the access door and for pivoting the access door between an open state and a closed state, and coupling at least one arm between the door frame and the access door and to switch the access door between the open state and the closed state.

Referring initially to FIGS. 1-3B, an access door assembly 100 according to the present disclosure is now described. As will be appreciated, the access door assembly 100 is to be installed within a floor structure 101 of a building (i.e. commonly known as a trapdoor). The access door assembly 100 illustratively includes a door frame 102 coupled to the floor structure 101 and defining an opening 103 aligned with a staircase 104. Of course, the staircase 104 provides access to a lower level below the floor structure 101, such as a basement, for example.

The door frame 102 illustratively includes first and second longitudinal sides 105*a*-105*b*. The first longitudinal side 105*a* is abutting a wall 106 of the building, and comprises a ledge support 107 coupled to the wall. The first longitudinal side 105*a* illustratively includes a plurality of fasteners 108*a*-108*b* coupling the ledge support 107 to the wall 106. The plurality of fasteners 108*a*-108*b* may comprise self-tapping fasteners for coupling to the wall 106, or an arrangement of a C-channel and associated fasteners.

The second longitudinal side 105*b* is abutting a floor joist 110. As perhaps best seen in FIG. 3A, the floor joist 110 is supported by a column 111 from the lower level. The floor joist 110 illustratively comprises a plurality of structural members 112*a*-112*c*, and a plurality of fasteners 113 coupling the plurality of structural members together. For example, the plurality of structural members 112*a*-112*c* may each comprise a wood lumber segment, such as a 2 inch by 4 inch by 8 feet lumber piece. For example, the plurality of fasteners 113 may comprise carriage bolts, and associated threaded nuts.

Figure 3A:
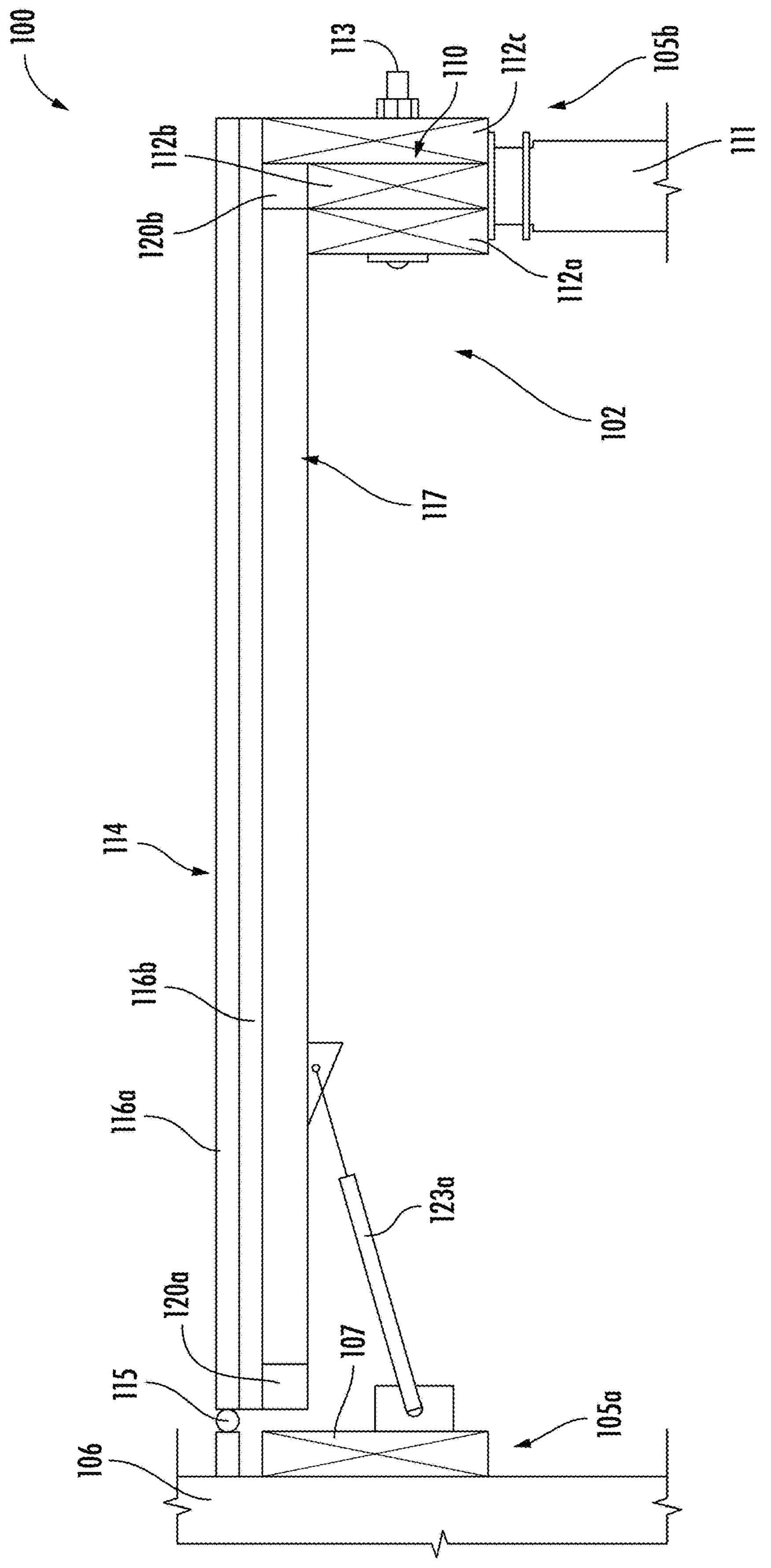
FIG. 3A is a schematic cross-sectional view of the access door assembly of FIG. 2 along line A-A.
Figure 3B:
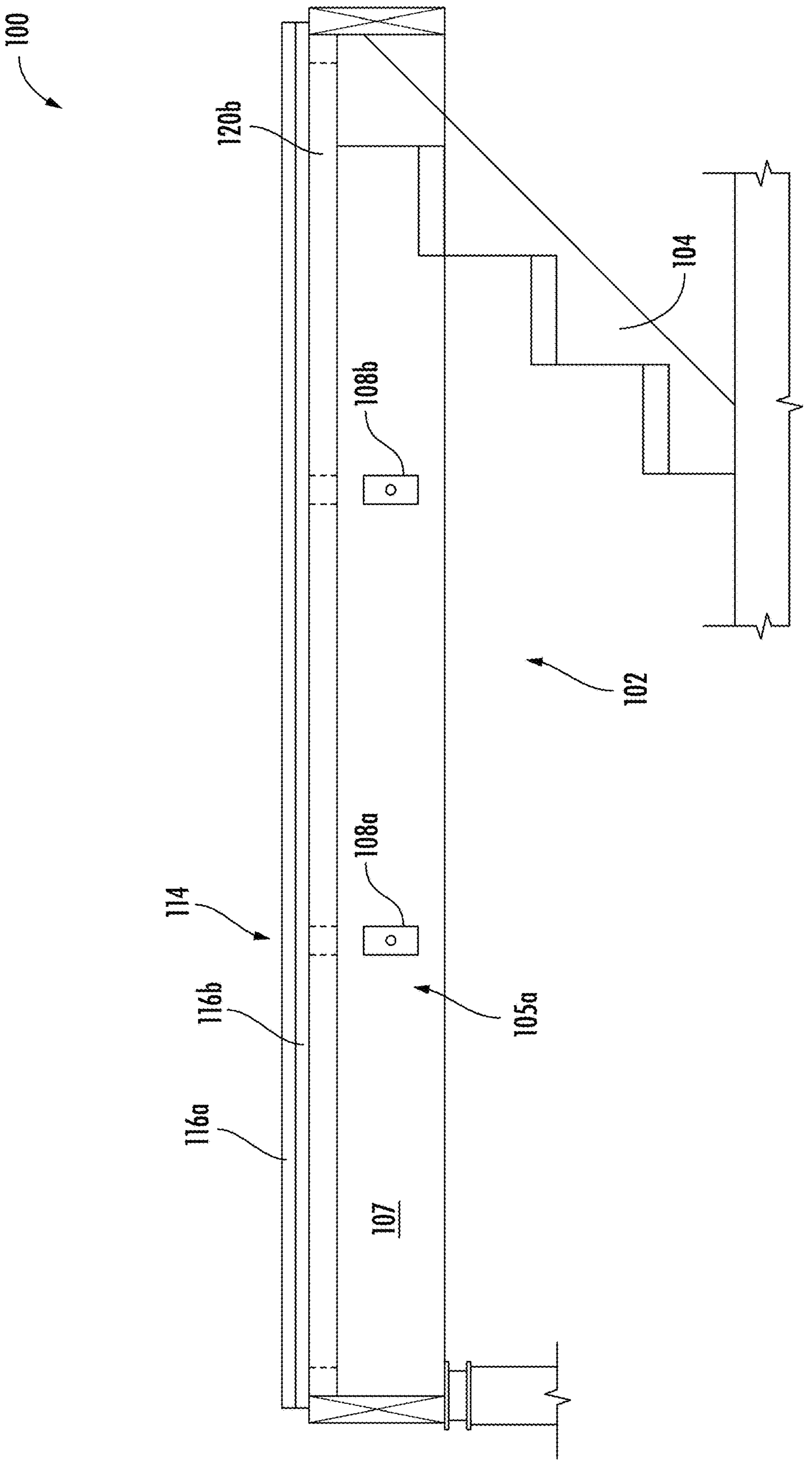
FIG. 3B is a schematic cross-sectional view of the access door assembly of FIG. 2 along line B-B.

The access door assembly 100 illustratively comprises an access door 114 within the opening 103, and a hinge 115 coupled between the door frame 102 and the access door and pivoting the access door between an open state (FIG. 1) and a closed state (FIG. 3A). In another embodiment, the hinge 115 may be coupled directly to the wall 106.

As perhaps best seen in FIG. 3A, the access door 114 illustratively comprises an upper layer 116*a*, a lower layer 116*b* below the upper layer, and a support frame 117 below the lower layer. The upper layer 116*a* comprises a finished floor surface to match adjacent portions of the floor structure 101, thereby concealing the existence of the access door assembly 100. The lower layer 116 comprises a rigid support layer comprising (i.e. a subfloor), for example, wood, aluminum, or steel. The support frame 117 comprises first and second frame sides 120*a*-120*b*, first and second ends 121*a*-121*b* extending between the first and second frame sides, and first and second cross members 122*a*-122*b* extending between the first and second frame sides. The support frame 117 may comprise any rigid material with sufficient strength to support vertical loads on the access door 114, such as aluminum, or steel, for example.

The access door assembly 100 illustratively comprises first and second arms 123*a*-123*b* coupled between the door frame 102 and the access door 114 and configured to switch the access door between the open state and the closed state. In the illustrated embodiment, each of the first and second arms 123*a*-123*b* comprises pneumatic struts to bias the access door 114 in the open state.

In other embodiments, the first and second arms 123*a*-123*b* may each comprise a motorized arm (e.g. a linear actuator) configured to switch the access door 114 between the open state and the closed state. In these embodiments, the access door assembly 100 is coupled to a power source, such as a grid power receptacle or a battery. Also, the access door assembly 100 may comprise a wireless transceiver and associated remote transmitter for remote opening and closing of the access door 114.

As perhaps best seen in FIG. 3A, the access door 114 provides a secure floor structure while in the closed state. In particular, the second longitudinal side 105*b* rests securely on the floor joist 110. In particular, the plurality of structural members 112*a*-112*c* of the floor joist 110 defines a flanged upper surface for receiving the access door 114. In particular, the upper layer 116*a*, the lower layer 116*b*, and the support frame 117 are received by this upper flanged surface. This arrangement prevents the access door 114 from moving laterally. Moreover, the support frame 117 transmits loads from the access door 114 to the floor joist 110 and the wall 106.

Figure 4:
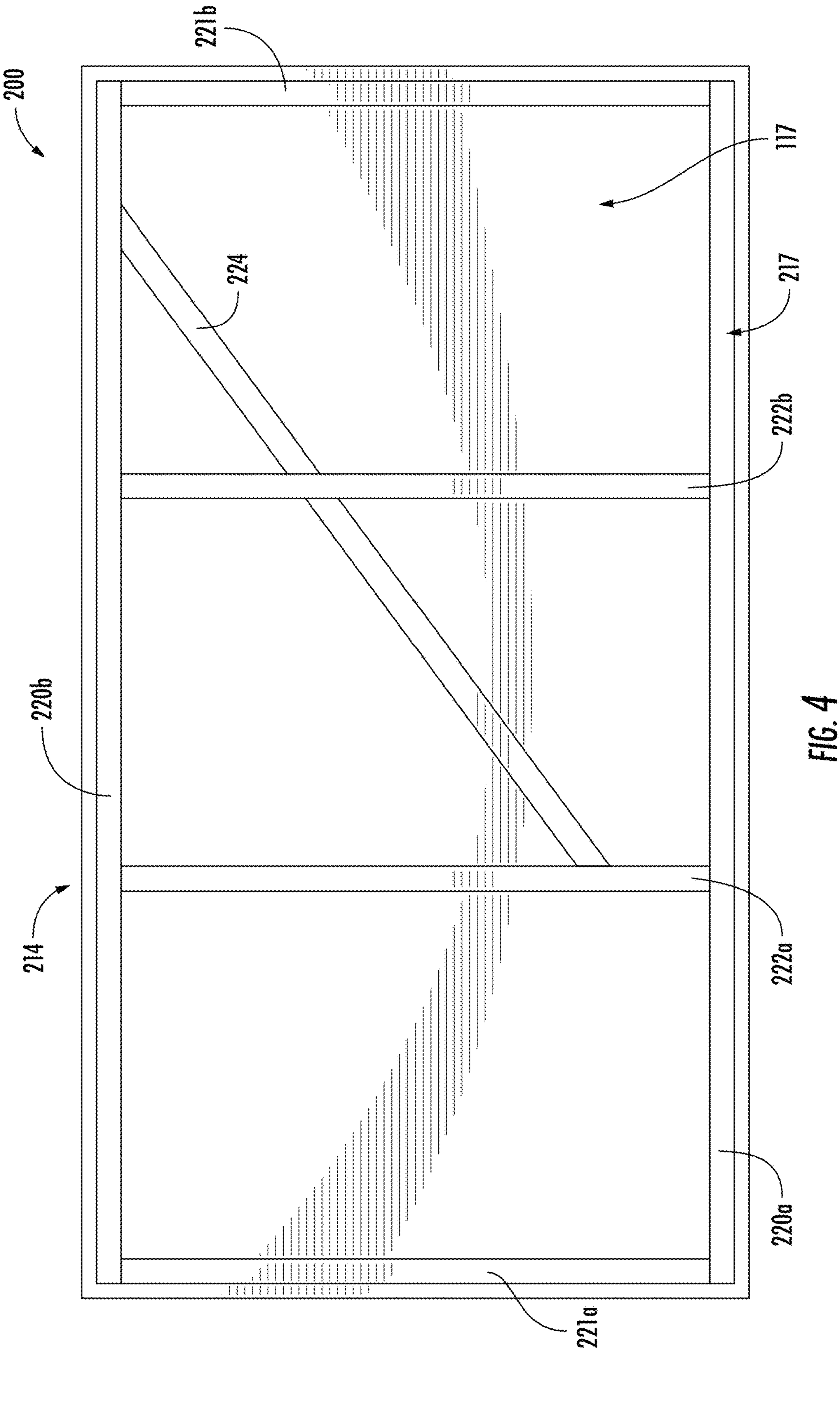
FIG. 4 is a schematic bottom plan view of a second example embodiment of the access door assembly, according to the present disclosure.

Referring now additionally to FIG. 4, another embodiment of the access door assembly 200 is now described. In this embodiment of the access door assembly 200, those elements already discussed above with respect to FIGS. 1-3B are incremented by 100 and most require no further discussion herein. This embodiment differs from the previous embodiment in that this access door assembly 200 illustratively includes a stair railing 224 coupled to the support frame 217 for providing easy access to the staircase. When the access door 214 is in the open state, the user may maintain a sure and safe grip while navigating the staircase.

Referring now to FIGS. 5-7 & 8A-8B, an access door assembly 300 is for a floor structure 301. As will be appreciated, the floor structure 301 is on a main floor, and the access door assembly 300 provides access to a lower floor beneath via a staircase 304. The floor structure 301 may comprise a wood floor structure, for example, but may include other flooring types.

The access door assembly 300 includes a door frame 302 coupled to the floor structure 301 and defining an opening aligned with the staircase 304. The door frame 302 illustratively includes first and second longitudinal door frame sides 305*a*-305*b*, and first and second longitudinal door frame ends 336*a*-336*b* extending between the first and second longitudinal door frame sides. In particular, the door frame 302 comprises first and second longitudinal supports 330*a*-330*b*. Each of the first and second longitudinal supports may comprise a plurality of structural members 312*a*-312*e*, and a plurality of fasteners 331 (only one shown) coupling the plurality of structural members together. As perhaps best seen in FIG. 5, the first longitudinal support 330*a* illustratively comprises a longitudinal protrusion 332 extending upward from the plurality of structural members 312*a*-312*b* and defining a pivot point. In this embodiment, the longitudinal protrusion 332 comprises a square cross-section shaped strip. As perhaps best seen in FIGS. 8A-8B, the longitudinal protrusion 332 comprises a strip with a rounded top (e.g. hemispheric shaped top).

The access door assembly 300 illustratively includes include a vertical column 311 extending upward from a lower level and supporting the second longitudinal support 330*b*. For example, the vertical column 311 may comprise a lally column.

The access door assembly 300 includes an access door 314 within the opening and comprising first and second longitudinal sides 333*a*-333*b*. The access door 314 comprises an upper layer 316, and a support frame 317 coupled to the upper layer. The support frame 317 comprises first and second frame sides 320*a*-320*b*, first and second frame ends 321*a*-321*b* extending between the first and second frame sides, first and second cross members 322*a*-322*b* extending between the first and second frame sides, and a railing 324 for the staircase 304 extending diagonally across the second cross member and being coupled to the first cross member. The support frame 317 is centered longitudinally and laterally within the upper layer 316.

Figure 5:
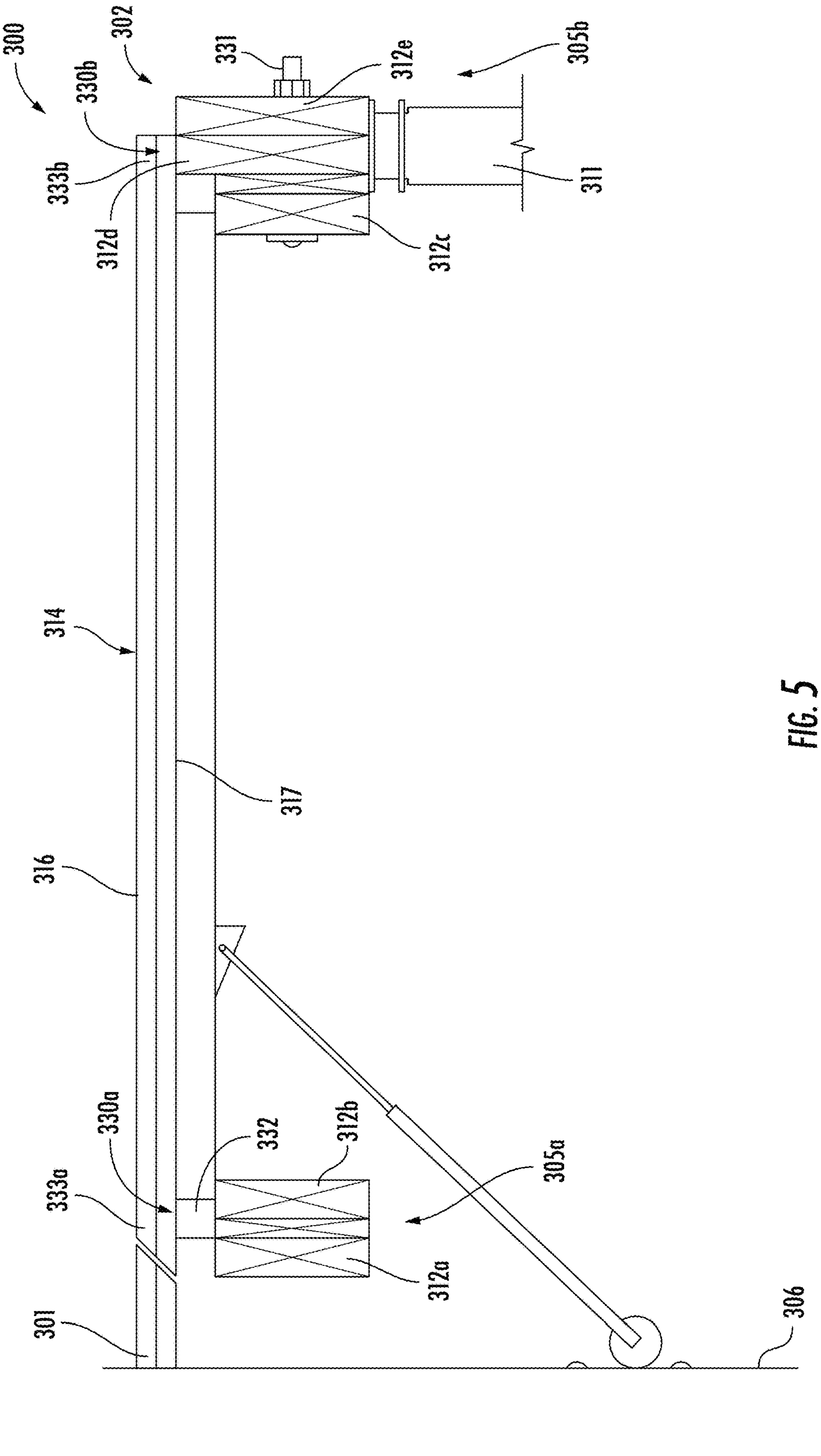
FIG. 5 is a schematic cross-sectional view of a third example embodiment of the access door assembly along line A-A.
Figure 6:
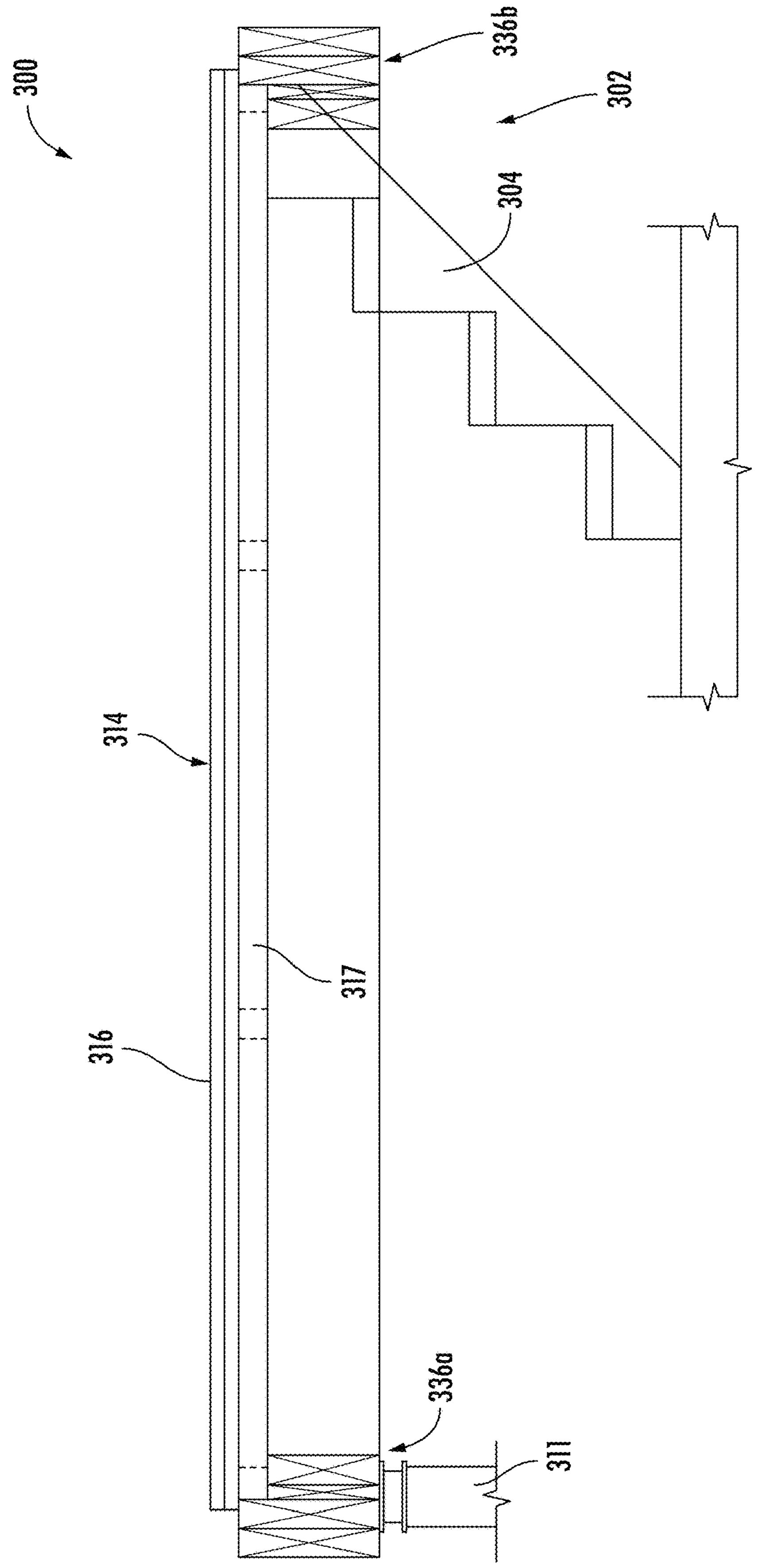
FIG. 6 is a schematic cross-sectional view of the access door assembly of FIG. 5 along line B-B.
Figure 7:
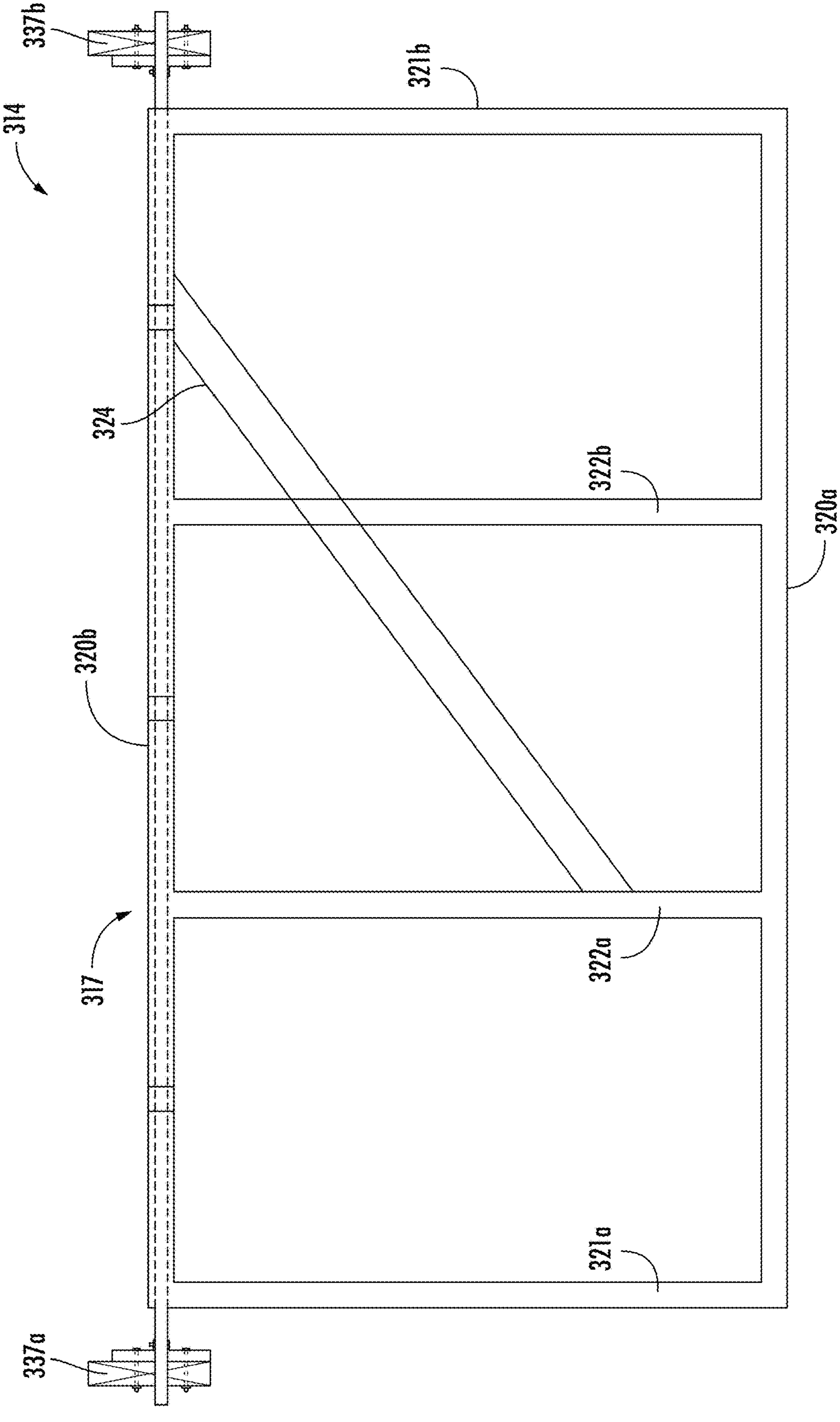
FIG. 7 is a schematic bottom plan view of the access door assembly of FIG. 5.
Figure 8A:
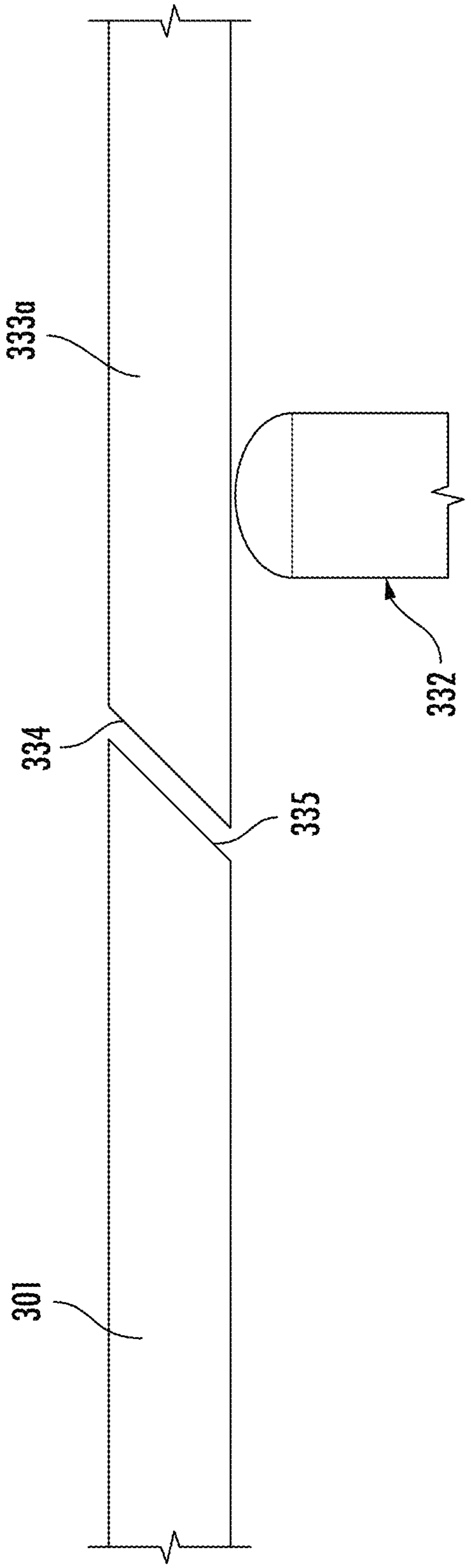
FIGS. 8A and 8B are enlarged schematic cross-sectional views of the access door assembly of FIG. 5 along line A-A with the access door in a closed state and an open state, respectively.
Figure 8B:
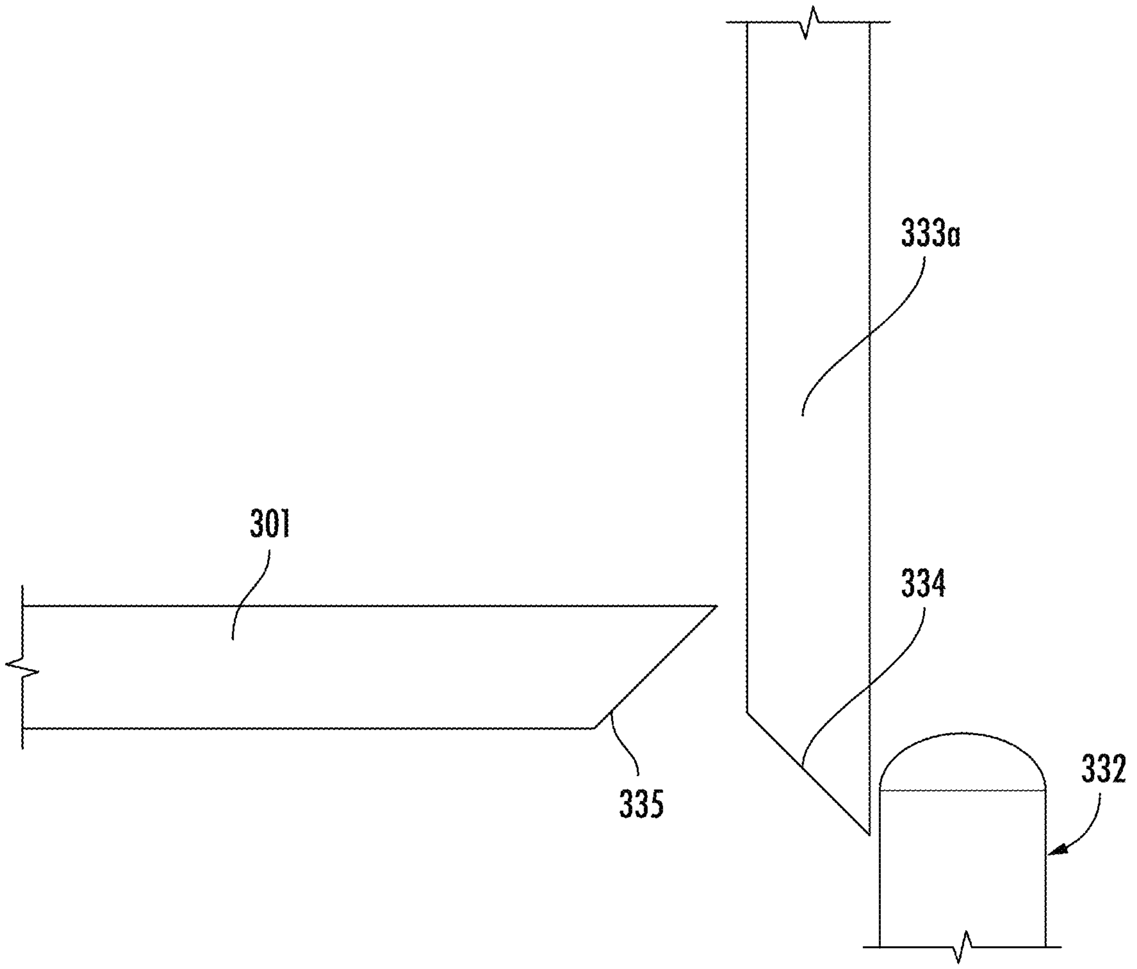

As perhaps best seen in FIGS. 5 & 8A-8B, the first longitudinal side 333*a* defines a first opposing bevelled surface 334, and the floor structure 301 adjacent the opening defines a second opposing bevelled surface 335. Each of the first and second opposing bevelled surfaces 334-335 may comprise a surface canted within an angular range of 30-60 degrees, for example.

The access door assembly 300 also includes an arm 323 coupled to the access door 314 and configured to pivot the access door between an open state (FIG. 8B) and a closed state (FIGS. 5 & 8A). In particular, the access door 314 pivots on the pivot point defined by the longitudinal protrusion 332. The first and second opposing bevelled surfaces 334-335 are aligned and abutting in the closed state, and are in spaced apart relation in the open state. Helpfully, when the access door 314 is in the closed state, an entirety of the door frame 302 may be below the floor structure 301.

In the illustrated embodiment, the arm 323 is coupled between the access door 314 and a building wall 306 extending from a lower level. Of course, in other embodiments, the arm 323 may be coupled to the door frame 302.

Another aspect is directed to a method for making an access door assembly 300 for a floor structure 301. The method comprises coupling a door frame 302 to the floor structure 301 and defining an opening aligned with a staircase 304, and positioning an access door 314 within the opening and comprising first and second longitudinal sides 333*a*-333*b*. The first longitudinal side 333*a* defines a first opposing bevelled surface 334, and the floor structure 301 adjacent the opening defines a second opposing bevelled surface 335. The method further includes coupling at least one arm 323 to the access door 314 and configured to pivot the access door between an open state and a closed state, the first and second opposing bevelled surfaces 334-335 being aligned and abutting in the closed state, and being in spaced apart relation in the open state.

The access door assembly 300 may provide for an approach to the issues with existing approaches. In particular, with the hingeless design of the access door assembly 300, the door frame 302 is completely hidden in the closed state. To the user, the floor structure 301 appears contiguous and uninterrupted, which is aesthetically pleasing.

Moreover, each of the access door assemblies 100, 200, 300 may be retrofitted readily to existing construction, freeing up space in the floor plan of the main floor. Given the demand for renovation and making lower floors accessible when they are currently not, the access door assemblies 100, 200, 300 provide a less costly approach that is safe and easy to use.

It should be appreciated that the individual features from each of the access door assemblies 100, 200, 300 may be combined with the other embodiments.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An access door assembly comprising:

a floor structure;

a staircase below the floor structure;

a door frame coupled to the floor structure and comprising first and second longitudinal supports defining an opening aligned with the staircase;

an access door within the opening and comprising first and second longitudinal sides, the first longitudinal side defining a first opposing bevelled surface, the floor structure adjacent the opening defining a second opposing bevelled surface; and at least one arm coupled to the access door and configured to pivot the access door between an open state and a closed state, the access door pivoting on the first longitudinal support without a hinge, the first and second opposing bevelled surfaces being aligned and abutting in the closed state, and being in spaced apart relation in the open state, an uppermost surface of the access door and an uppermost surface of the floor structure being flush in the closed state.

2. The access door assembly of claim 1 wherein the first longitudinal support comprises a rounded uppermost portion, the access door pivoting on the rounded uppermost portion.

3. The access door assembly of claim 1 further comprising a vertical column extending upward from a lower level and supporting the second longitudinal support.

4. The access door assembly of claim 2 wherein each of the first and second longitudinal supports comprises a plurality of structural members coupled together.

5. The access door assembly of claim 4 wherein the first longitudinal support comprises a longitudinal protrusion extending upward from the plurality of structural members and defining the rounded uppermost portion.

6. The access door assembly of claim 1 wherein the at least one arm is coupled between the access door and a building wall extending from a lower level.

7. The access door assembly of claim 1 wherein the access door comprises an upper layer, and a support frame coupled to the upper layer; and wherein the support frame comprises first and second frame sides, first and second frame ends extending between the first and second frame sides, first and second cross members extending between the first and second frame sides, and a railing for the staircase extending diagonally across at least one of the first and second cross members.

8. The access door assembly of claim 1 wherein when the access door is in the closed state, an entirety of the door frame is below the floor structure.

9. The access door assembly of claim 1 wherein each of the first and second opposing bevelled surfaces comprises a surface canted within an angular range of 30-60 degrees.

10. An access door assembly comprising:

a floor structure;

a staircase below the floor structure;

a door frame coupled to the floor structure and defining an opening aligned with the staircase, the door frame comprising first and second longitudinal supports;

an access door within the opening and comprising first and second longitudinal sides, the first longitudinal side defining a first opposing bevelled surface, the floor structure adjacent the opening defining a second opposing bevelled surface; and at least one arm coupled between the access door and a building wall extending from a lower level, the first longitudinal support comprising a rounded uppermost portion, the at least one arm configured to pivot the access door upon the rounded uppermost portion of the first longitudinal support without a hinge and between an open state and a closed state, the first and second opposing bevelled surfaces being aligned and abutting in the closed state, and being in spaced apart relation in the open state, an uppermost surface of the access door and an uppermost surface of the floor structure being flush in the closed state.

11. The access door assembly of claim 10 further comprising a vertical column extending upward from a lower level and supporting the second longitudinal support.

12. The access door assembly of claim 10 wherein each of the first and second longitudinal supports comprises a plurality of structural members coupled together.

13. The access door assembly of claim 12 wherein the first longitudinal support comprises a longitudinal protrusion extending upward from the plurality of structural members and defining the rounded uppermost portion.

14. The access door assembly of claim 10 wherein the access door comprises an upper layer, and a support frame coupled to the upper layer; and wherein the support frame comprises first and second frame sides, first and second frame ends extending between the first and second frame sides, first and second cross members extending between the first and second frame sides, and a railing for the staircase extending diagonally across at least one of the first and second cross members.

15. The access door assembly of claim 10 wherein when the access door is in the closed state, an entirety of the door frame is below the floor structure.

16. The access door assembly of claim 10 wherein each of the first and second opposing bevelled surfaces comprises a surface canted within an angular range of 30-60 degrees.

17. A method for making an access door assembly for a floor structure, the method comprising:

coupling a door frame to the floor structure and defining an opening aligned with a staircase below the floor structure, the door frame comprising first and second longitudinal supports;

positioning an access door within the opening and comprising first and second longitudinal sides, the first longitudinal side defining a first opposing bevelled surface, the floor structure adjacent the opening defining a second opposing bevelled surface; and coupling at least one arm to the access door and configured to pivot the access door between an open state and a closed state, the access door pivoting on the first longitudinal support without a hinge, the first and second opposing bevelled surfaces being aligned and abutting in the closed state, and being in spaced apart relation in the open state, an uppermost surface of the access door and an uppermost surface of the floor structure being flush in the closed state.

18. The method of claim 17 wherein the first longitudinal support comprises a rounded uppermost portion, the access door pivoting on the rounded uppermost portion.

19. The method of claim 18 wherein each of the first and second longitudinal supports comprises a plurality of structural members coupled together.

20. The method of claim 19 wherein the first longitudinal support comprises a longitudinal protrusion extending upward from the plurality of structural members and defining the rounded uppermost portion.

* * * * *